June 19, 1923.
A. CLEVELAND
MANUALLY PROPELLED WAGON
Filed June 29, 1922
1,459,573
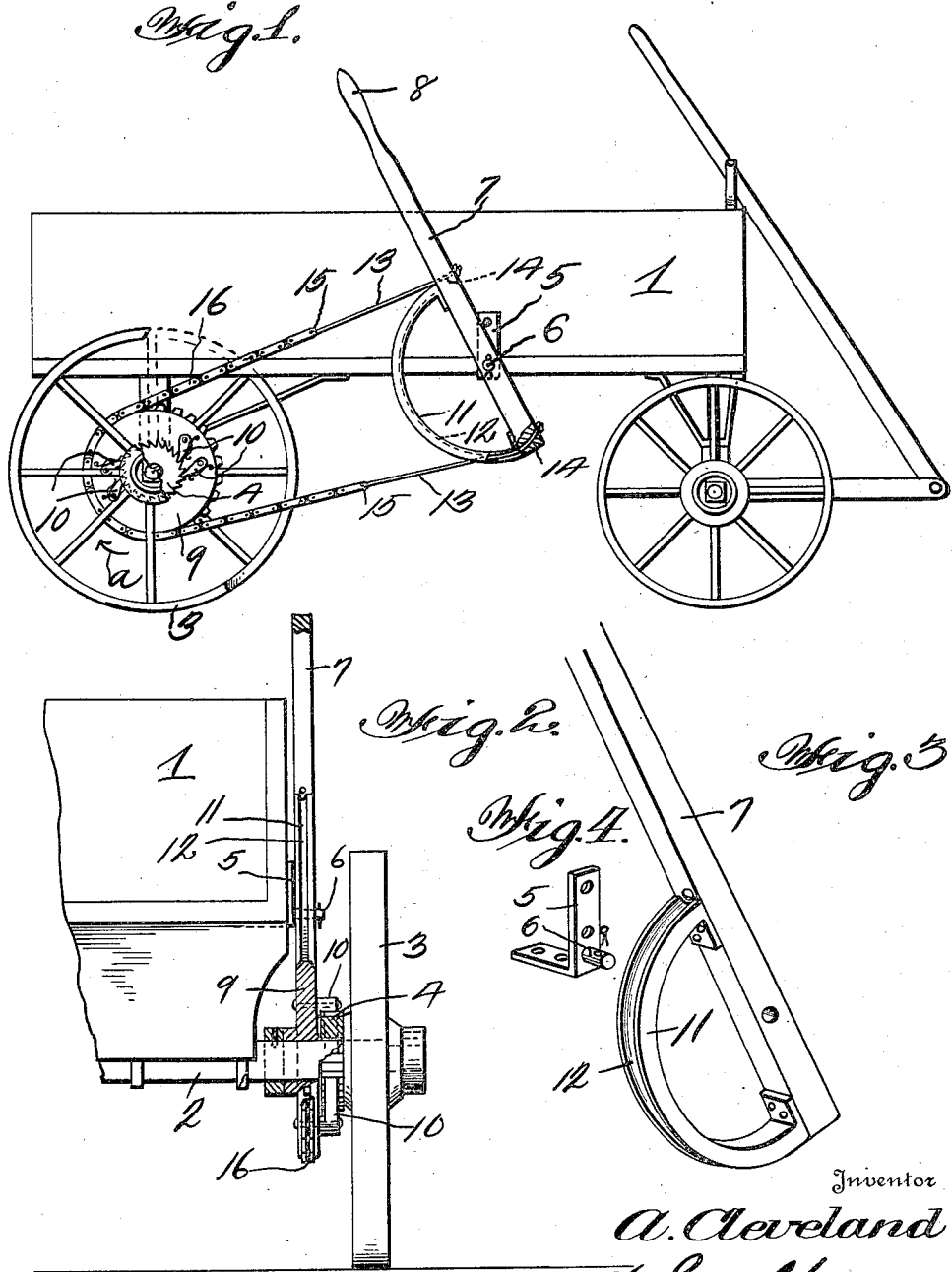

Patented June 19, 1923.

1,459,573

UNITED STATES PATENT OFFICE.

ARTHUR CLEVELAND, OF DETROIT, MICHIGAN.

MANUALLY-PROPELLED WAGON.

Application filed June 29, 1922. Serial No. 571,677.

*To all whom it may concern:*

Be it known that I, ARTHUR CLEVELAND, a citizen of the United States, residing at Detroit, in the county of Wayne, State of Michigan, have invented a new and useful Manually-Propelled Wagon; and I do hereby declare the following to be a full, clear, and exact description of the invention, such as will enable others skilled in the art to which it appertains to make and use the same.

The invention relates to wagons, and has for its object to provide a device of this character comprising a pivoted lever having a segmentally shaped grooved portion, to the ends of which cables are anchored, said cables being attached to the ends of a sprocket chain extending over a sprocket loosely mounted on the axle of the wagon and cooperating with the wheel of a wagon through a ratchet. The ratchet forming means whereby upon oscillation of the handle in one direction the wheel will be revolved, and the wagon propelled forwardly.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:

Figure 1 is a side elevation of the wagon, part of one of the wheels being broken away to better show the structure.

Figure 2 is a rear view of one side of the wagon, part of the sprocket and ratchet wheel being broken away to better show the structure.

Figure 3 is a perspective view of the lower portion of the operating lever.

Figure 4 is a perspective view of the bracket to which the lever is pivoted.

Referring to the drawing, the numeral 1 designates the body of the wagon, and 2 the rear axle thereof. Rotatably mounted on the rear axle is a wheel 3, which wheel is provided with a ratchet 4. Secured to the side of the body 1 is a right angularly shaped bracket 5 having a cylindrical lug 6 and pivotally mounted on the cylindrical lug 6 is an operating handle 7, which handle is adapted to be grasped at its handle end 8 by the operator and oscillated for propelling the vehicle forwardly. Rotatably mounted on the shaft 2 is a sprocket wheel 9, which sprocket wheel is provided with a plurality of spring actuated dogs 10, which cooperate with the ratchet wheel 4. It will be seen that when the sprocket wheel 9 is rotated in the direction of the arrow *a*, that the dogs 10 will engage the ratchet wheel 4 carried by the wheel 3 in such a manner that said ratchet wheel and wheel will rotate in the same direction as the sprocket 9 thereby propelling the wagon forwardly. Secured to the rear side of the operating lever 7 is a segmentally shaped cable guide member 11, which is provided with a groove 12 concentric in relation to the lug 6, which groove receives the cables 13, which are secured at 14 to the lever adjacent the ends of the groove 12, and are received in the groove 12 as the lever is oscillated for propelling the vehicle forwardly. The rear ends of the cables 13 are secured at 15 to the ends of a sprocket chain 16, which sprocket chain extends over the sprocket wheel 9, and intermittently rotates the wheel 3 during the oscillation of the lever 7.

From the above it will be seen that a manually propelled wagon is provided, whereby a child within the wagon can easily propel the same and one wherein the parts have been reduced to a minimum thereby allowing the device to be cheaply constructed and sold and the operation positive.

The invention having been set forth what is claimed as new and useful is:—

The combination with a wagon comprising a body, wheels supporting said body, one of said wheels being rotatably mounted on an axle, a ratchet wheel carried by said rotatable wheel, a sprocket rotatably mounted on the axle, ratchet dog connections between the sprocket and the ratchet wheel, an operating lever pivoted to the body in the same plane as the sprocket, a segmentally shaped grooved guide member carried by the operating lever, a sprocket chain extending over the sprocket, cables connected to the ends of the sprocket chain, said cables being secured to the operating lever adjacent the ends of the grooved member carried thereby, said cables being in the same plane as the groove of the segmentally shaped member.

In testimony whereof I have signed my name to this specification in the presence of two subscribing witnesses.

ARTHUR CLEVELAND.

Witnesses:
DAVID C. ROYER,
HORACE H. BERRY.